W. H. McCALL.
Improvement in Cocoa-Nut Graters.

No. 129,288.  Patented July 16, 1872.

Witnesses:
E. Wolff
W. A. Graham

Inventor:
Wm. H. McCall
Per Munn & Co
Attorneys.

UNITED STATES PATENT OFFICE.

WILLIAM H. McCALL, OF PHILADELPHIA, PENNSYLVANIA.

IMPROVEMENT IN COCOA-NUT GRATERS.

Specification forming part of Letters Patent No. 129,288, dated July 16, 1872.

Specification describing a new and useful Improvement in Cocoa-Nut Grater, invented by WILLIAM H. McCALL, of Philadelphia, in the county of Philadelphia and State of Pennsylvania.

Figure 1:
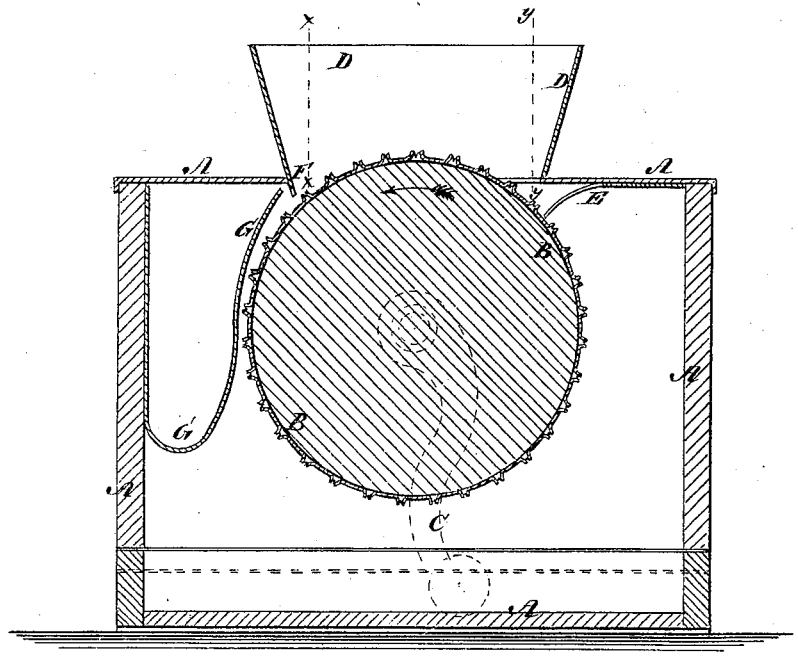
Figure 2:
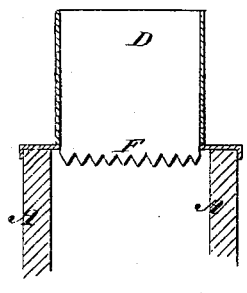
Figure 3:
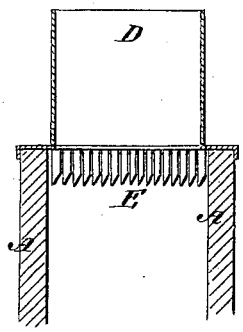

Figure 1 is a detail vertical section of my improved cocoa-nut grater. Fig. 2 is a detail section of the same taken through the line $x$ $x$, Fig. 1. Fig. 3 is a detail section of the same taken through the line $y$ $y$, Fig. 1.

Similar letters of reference indicate corresponding parts.

My invention has for its object to furnish an improved machine for grating cocoa-nuts, which shall be simple in construction, convenient in use, and effective in operation; and it consists in the construction and combination of the various parts of the machine, as hereinafter more fully described.

A represents a box, which may be made of wood or other suitable material, and which should be made with a sliding drawer in its lower part to receive the grated cocoa-nut, and enable it to be conveniently removed. B is the grating-cylinder, the shell of which is formed of perforated sheet metal, the perforations being made from the inner or concave side, so as to leave the burrs upon the outer or convex side of said cylinder B. The grating-cylinder B is attached to a shaft, or has journals attached to it which revolve in bearings in the sides of the box A. One of the journals of the cylinder B projects, and to it is attached the crank C, by which the said cylinder is revolved. To the top of the box A is attached a hopper, D, to receive the cocoa-nut to be grated, which cocoa-nut rests upon the top of the cylinder B. E is an elastic plate attached to the top of the box A, upon the forward edge of which are formed teeth which are curved downward to clean off the face of the cylinder B as it revolves. The end plate of the forward end of the hopper D projects downward, and has teeth F formed upon it to hold the cocoa-nut while being grated. The teeth F may, if desired, be formed upon a separate plate attached to the said forward end of the hopper. G is an elastic plate secured in the forward part of the box A, and which is curved to correspond with the curve of the cylinder B, as shown in Fig. 1, and which is designed to detain any small pieces of cocoa-nut that may pass the teeth F until they may be further acted upon by the grating-cylinder.

Having thus described my invention, I claim as new and desire to secure by Letters Patent—

An improved cocoa-nut grater, consisting of the box A, grating-cylinder B, crank C, hopper D, elastic toothed plate E, teeth F, and elastic curved plate G, said parts being constructed, arranged, and operating substantially as herein shown and described, and for the purpose set forth.

WILLIAM H. McCALL.

Witnesses:
 THOMAS McCUSKER,
 WM. H. BLACKWOOD.